United States Patent [19]
Cailloux

[11] 4,006,623
[45] Feb. 8, 1977

[54] POSITIONING DEVICE
[75] Inventor: Paul Cailloux, La Varenne Saint Hilaire, France
[73] Assignee: Promecam Sisson-Lehmann, Saint Denis, France
[22] Filed: June 3, 1975
[21] Appl. No.: 583,504
[30] Foreign Application Priority Data
June 10, 1974 Italy .................................. 23779/74
Oct. 15, 1974 France ............................. 74.34613
[52] U.S. Cl. .................................. 72/461; 72/389; 83/393; 83/467 R
[51] Int. Cl.² .................... B21D 11/20; B21D 11/22
[58] Field of Search ..... 72/461, 389, 441, DIG. 21; 83/163, 391, 392, 393, 467, 468

[56] References Cited
UNITED STATES PATENTS 2,782,831  2/1957  Todd, Jr. ........................ 72/461 X
3,733,885  5/1973  Brauer .............................. 72/461
3,874,206  4/1975  Cailloux ........................ 72/441 X Primary Examiner—C.W. Lanham
Assistant Examiner—D. M. Gurley
Attorney, Agent, or Firm—Michael J. Striker

[57] ABSTRACT

A positioning device comprises a moving carriage for supporting members which serve to position a part to be machined and the position of which is determined by an adjustable stop. The device consists of a rotary drum provided with a series of studs of variable length, each stud being moved in turn opposite to a movable bearing member which is coupled with the carriage by means of a motion-reduction mechanism so that the range of motion of the bearing member is smaller than the range of motion of the carriage and in a predetermined ratio.

6 Claims, 5 Drawing Figures

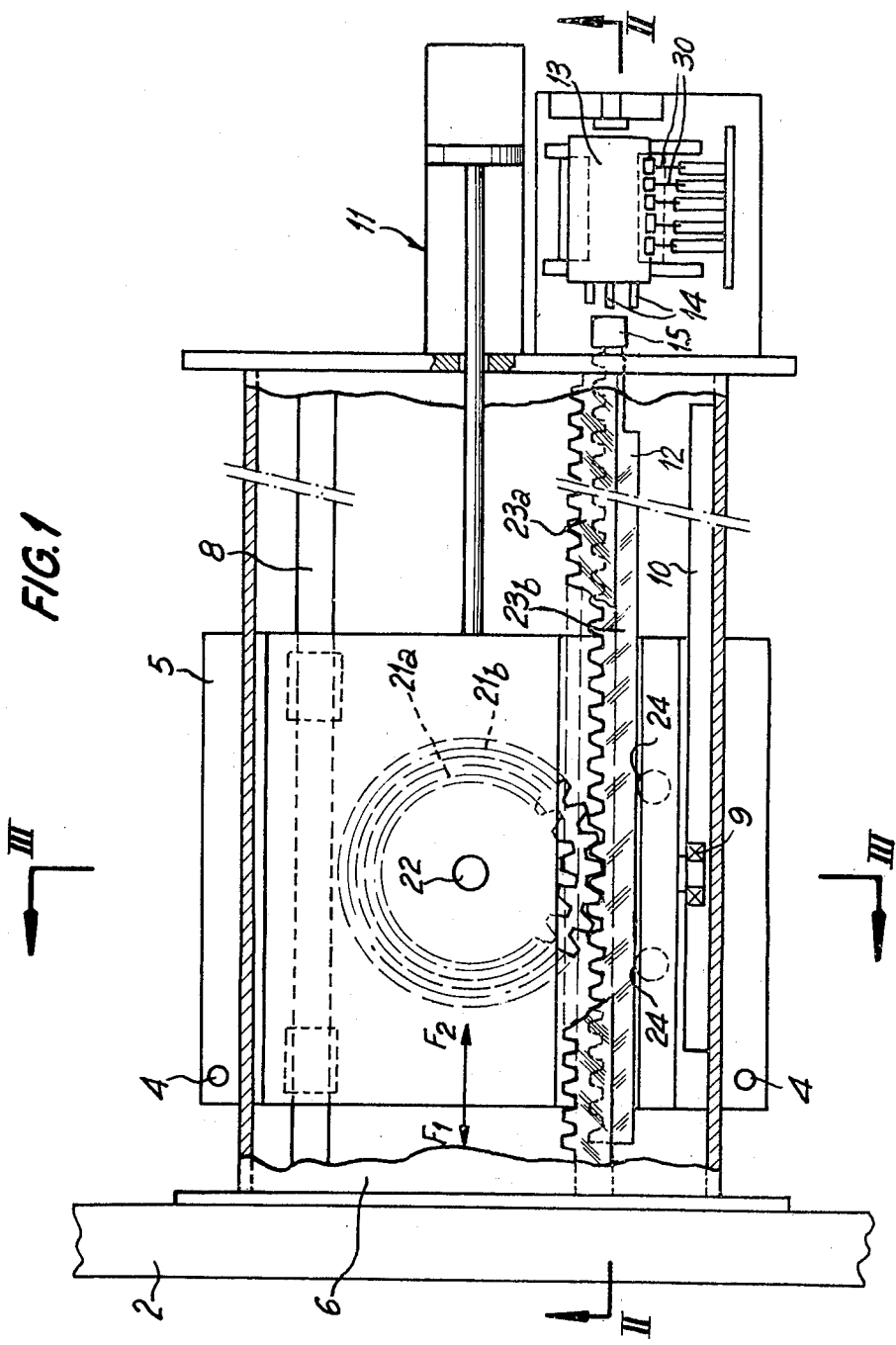

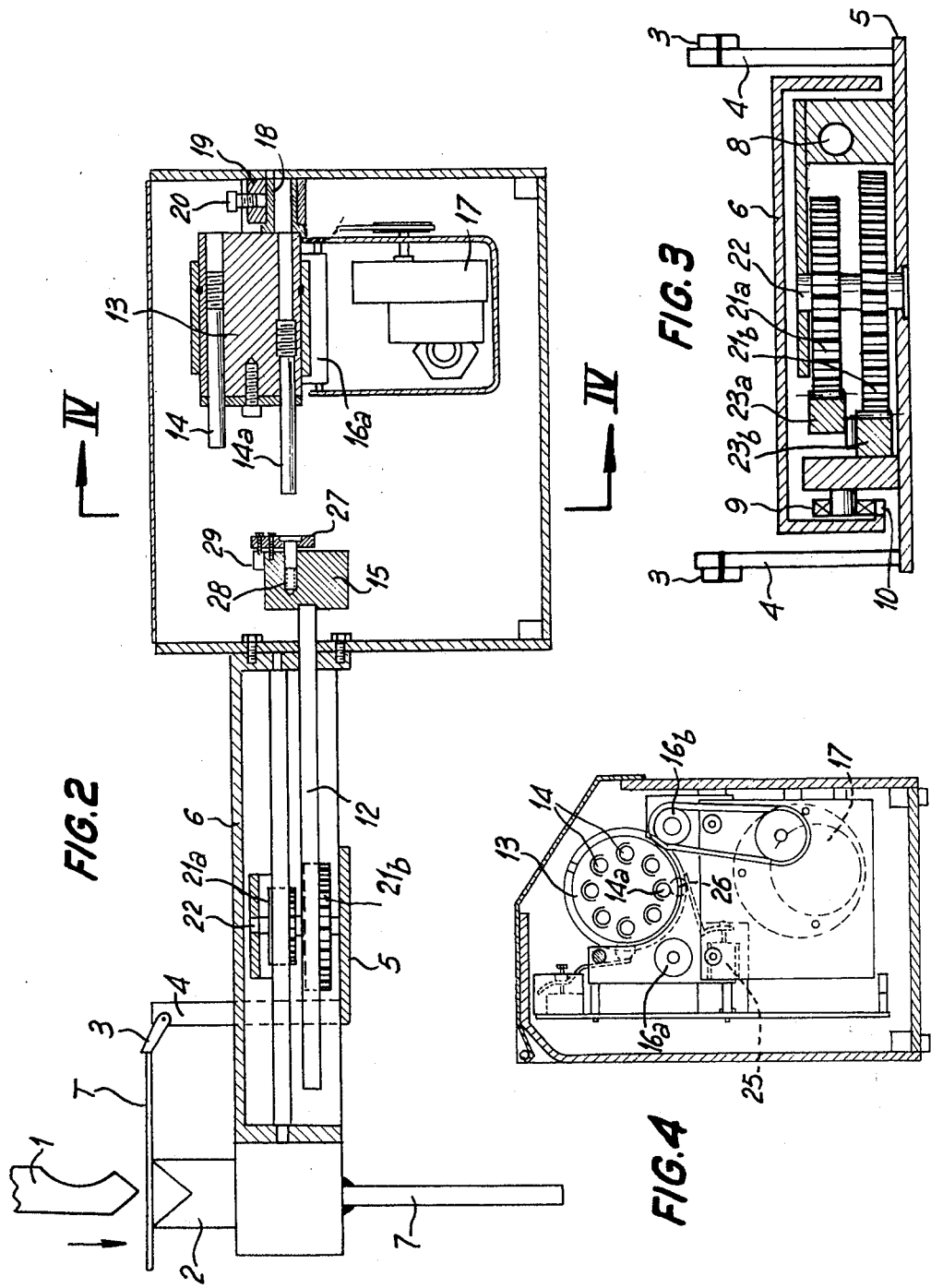

POSITIONING DEVICE

This invention relates to adjustable stops which serve to impart different positions to a part which is to be machined on a machine-tool, for example a metal sheet on a bending press.

Devices for placing a part of this type in a series of different successive positions are already known. In the case of a bending press, devices of this type are employed for producing a succession of bends on the same sheet.

However, existing designs of devices employed for this purpose are particularly complex and costly. Moreover, the preliminary operations which have to be performed in order to set parts in the different positions required are relatively difficult and time-consuming. Under these conditions, these devices are somewhat ill-suited to frequent changes of programs.

For the reasons just stated, the aim of the present invention is to provide a device of simpler design so that any part to be machined can thus readily be placed in a succession of different positions. Moreover, the basic concept of this device is such that the program of positions provided can be changed very easily.

The device under consideration comprises a moving carriage which serves to support members for retaining the part to be machined and the position of which is determined by an adjustable stop. However, this device is distinguished by the fact that it consists of a rotary drum provided with a series of studs of variable length, each stud being moved in turn to a location opposite to a movable bearing member which is coupled with the carriage by means of a motion-reduction mechanism, said mechanism being capable of permitting said bearing member to move in a range of motion which is smaller than the range of motion of the carriage and in a predetermined ratio thereto.

The device according to the invention comprises a series of similar and interchangeable rotary drums corresponding to different predetermined programs. Thus in order to change the program of the positions in which parts to be machined are set, it is only necessary to withdraw the rotary drum which is in position on the device under consideration and to replace it by another drum in which the studs have been adjusted to correspond to the new program desired.

In a particular form of construction of the device in accordance with the invention, the mechanism for motion reduction between the carriage and the bearing member which abuts against the studs of the rotary drum comprises two toothed racks in mesh with two toothed wheels of different diameter which are coupled together and rotatably mounted on the carriage, one of said toothed racks being stationary whilst the other is connected to the movable bearing member which is intended to come into contact with one of the studs of the rotary drum.

However, the motion-reduction mechanism can be of different design as will be made clear in the following description which is given with reference to the accompanying drawings solely by way of example, and in which:

FIG. 1 is a top plan view which is partially broken away and shows a first embodiment of the device in accordance with the invention;

FIGS. 2 and 3 are sectional views respectively along the line II—II and III—III of FIG. 1;

FIG. 4 is a sectional view along the line IV—IV of FIG. 2;

Figure 5:
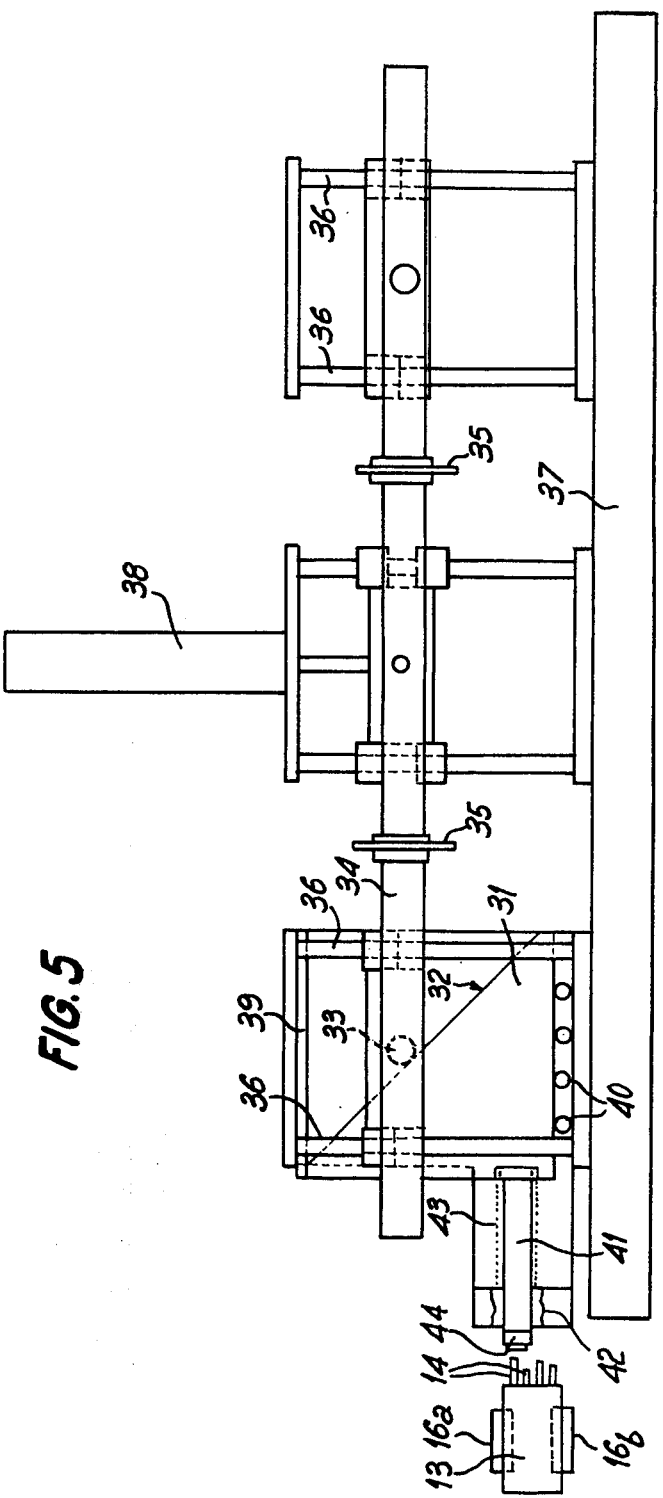
FIG. 5 is a top plan view showing another embodiment of the device in accordance with the invention.

The device which is illustrated in FIGS. 1 to 4 is fitted in a bending press, only the punch 1 and the die 2 of which are shown. This device is intended to serve as a rear position-adjustment stop for a metal sheet T which is intended to be bent on said press.

To this end, said device comprises two stop contact-keys 3 carried by two pillars 4 which are rigidly fixed to a moving carriage 5 mounted on a stationary support bracket 6 at the rear of the table 7 which carries the die 2. However, in the case in which the die 2 is carried by a stationary table, the support bracket 6 can also be rigidly fixed to the frame of the machine.

The carriage 5 is capable of moving in a direction at right angles to the general central plane of the die 2 as indicated by the arrows $F_1$ and $F_2$. To this end, said carriage 5 is slidably mounted on one side on a horizontal guide rod 8. On the other side, the carriage 5 is provided with one or a number of runner-wheels 9 which move along a guide track 10 carried by the stationary support bracket 6. The movements of displacement of the carriage 5 are controlled by an operating rod of a jack 11.

Provision is made for an adjustable stop device at the rear of the support bracket 6 of said carriage, said device being intended to cooperate with a thrust member 12 which is associated with the motion of said carriage 5. Said stop device is essentially constituted by a rotary drum 13 which carries a series of screws 14 and these latter are intended to constitute a corresponding number of studs so arranged as to project from that face of said drum 13 which is directed towards the movable thrust member 12, said member 12 being associated with the carriage 5 as stated earlier. The general arrangement is such that, in each angular position of said drum 13 only one of its studs is capable of constituting a stop for an end-piece 15 which is fitted on the corresponding extremity of the thrust member 12. Thus in the position illustrated in FIG. 2, only the lower stud 14a is in a position to constitute a stop for the end-piece 15.

The positions of these different studs can be so adjusted that they project to a greater or lesser extent with respect to the body of the rotary drum 13. Said drum 13 is mounted in such a manner as to ensure that it can be very readily removed. To this end, the drum is simply placed on two rollers 16a and 16b which constitute a type of cradle and one of which is capable of driving said drum 13 in rotation about its own axis, namely the roller 16b which is in turn driven by a reduction-gear motor 17.

On the side remote from the thrust member 12, the rotary drum 13 in turn abuts against an adjustable sleeve 18 which makes it possible to modify the position of all the projecting studs 14 to the same extent. Said sleeve 18 is slidably fitted within a stationary support bracket 19 and can be locked in any desired position by means of a screw 20.

The thrust-bearing member 12 is associated with the motion of the carriage 5 by means of a motion-reduction mechanism which is capable of moving said member 12 a range of motion which is smaller than the range of motion of the carriage 5 and in a predetermined ratio thereto.

In the example illustrated, said mechanism is constituted by two toothed wheels 21a and 21b of different diameters which are coupled together and freely mounted for simultaneous rotation about a shaft 22 supported by the carriage 5. Said two toothed wheels 21a, 21b are in meshing engagement with two toothed racks, namely a stationary rack 23a and a rack 23b which is connected with thrust member 12. The thrust member 12 is supported on runner-wheels 24.

The ratio of reduction of the motion of the thrust member 12 with respect to the motion of the carriage 5 is, of course determined by the difference in diameter between the two toothed wheels 21a and 21b. It is in fact possible to provide a relatively large reduction ratio of 1:10, for example by accordingly changing the respective diameters of the toothed wheels 21a, 21b.

Under these conditions, the relatively small differences in length between the different studs 14 of the rotary drum 13 make it possible to set the carriage 5 in a number of different positions which are located at much greater distances from each other. The drum 13 can therefore have a small overall size.

The studs 14 of said drum 13 make it possible to impart a series of different positions, not only to the carriage 5 but also to the metal sheet T which abuts against the stop contact-keys 3. After each bending operation, the carriage 5 is displaced by the jack 11 and its new position is determined very precisely by the following stud 14 of the rotary drum 13 which performs a fraction of a revolution between two successive operations of the bending press.

Stopping of the rotary drum 13 in each of its angular work positions is ensured by means of a switch 25 which is connected to the control circuit of the motor 17. An operating member 26 of said switch is so arranged as to be actuated by the projecting stud 14a of the rotary drum 13 when this latter reaches its work position at the rear of the movable endpiece 15 of the thrust member 12 to thereby deenergize the motor 17. However, said stud 14a is intended to produce action on the operating member 26 only if such stud 14a is in fact located in a projecting position. Under these conditions, if one or a number of studs 14 of the rotary drum 13 are put out of service, the motor 17 continues to drive the drum in rotation until the moment when a stud 14 comes into a projecting position in readiness to act as a stop for the end-piece 15 of the thrust member 12.

Said end-piece 15 carries a control key 27 which is intended to come into contact with that stud 14a of the rotary drum 13 which is in service. A spring 28 normally tends to maintain said control key 27 in the outwardly extended position, said key 27 being capable of actuating a microswitch 29 which is connected in the control circuit of the motor 17.

The control mechanism of the moving carriage 5 in fact ensures rearward displacement of this latter in the direction of the arrow $F_2$ which has the effect of displacing the thrust member 12 in the forward direction after each work operation of the press. Under these conditions, the movable control key 27 returns to its initial position at this moment and produces action on the microswitch 29 which consequently initiates the operation of the motor 17 and therefore the movement of rotation of the drum 13 so that this latter takes up another angular work position.

At this moment, the switch 25 which stops the rotary drum 13 also initiates reversal of the direction of motion of the jack 11 which displaces the carriage 5 in the forward direction until the thrust member 12 comes into abutment against that projecting stud 14 of the rotary drum which is in service and thus stops the carriage 5.

The constructional design of the device according to the invention therefore makes is possible to obtain automatically a predetermined program of different successive positions for the metal sheets T to be bent so as to form a series of different bends on each sheet T. However, it is very easy to change this program without entailing the need to carry out further preliminary adjustment operations. A change from one program to another can therefore be performed very rapidly.

The device under consideration in fact is equipped with a series of interchangeable rotary drums 13 which are all identical but the studs 14 of which can be adjusted to different positions so as to project to a greater or lesser extent. Thus each drum 13 is encoded with a predetermined program. In order to effect a change of program, it is therefore only necessary to withdraw the drum 13 which is in service and to replace this latter by another simply by placing this latter on the cradle formed by the two rollers 16a and 16b.

This device can advantageously comprise a sequence indicating system. This latter can be controlled by a series of contacts, the having operating members 30 which are placed in contact with the external surface of the rotary drum 13 which is in service. Said surface is accordingly provided with a certain number of flat positions or notches in order to operate the corresponding contactor at the proper time. It is thus possible to construct an indicating system for display by the binary code method.

As has already been mentioned, the design of the motion-reduction mechanism provided between the moving carriage 5 and the thrust member 12 which abuts against the studs 14 of the rotary drum 13 can be different from that of the example described in the foregoing.

FIG. 5 accordingly illustrates another form of construction of the present device in which said motion-reduction mechanism comprises a moving wedge 31 having a sloping guide ramp 32, a roller 33 being adapted to contact said guide ramp 32 and mounted on a carriage 34 which supports positioning members 35.

Said carriage 34 is movably mounted on a series of guide rods 36 placed at the rear of a die 37 of a bending press and which extend at right angles to the general central plane of this latter. The displacement of said carriage 34 is obtained by a jack 38.

The moving wedge 31 of the motion-reduction mechanism is guided in its movements on the one hand by means of a stationary guide 39 and on the other hand by means of a series of runner-wheels 40. On the side which faces outwards, said wedge 31 carries a projecting arm 41 which extends at right angles to the axis of displacement of the carriage 34 and which is slidably mounted in a stationary bearing 42. Said arm 41 constitutes the movable thrust member which abuts against the projecting studs 14 of the rotary drum 13 of an adjustable stop device as described in the foregoing.

However, a spring 43 tends to restore the moving wedge 31 and its projecting arm 41 to the position of withdrawal. Provision is made at the extremity of said arm 41 for an end-piece 44 fitted with a pneumatic valve which serves to stop the motion of the jack 38 and with a contact for re-starting the motion of the rotary drum 13.

Moreover, the arrangement of the stop device and the initiation of motion of the pneumatic jack 38 are the same as in the previous embodiment. Thus the rotary drum 13 is also placed in a removable manner on two rollers 16a and 16b and is driven in rotation by one of these latter. Said drum 13 can therefore be readily replaced by another drum 13 in order to change the program of the positions selected for the part to be machined.

In the case of the reduction mechanism provided in the device shown in FIG. 5, the motion-reduction ratio between the bearing member 41 and the corresponding carriage 34 is determined by the angle of slope of the guide ramp 32 of the moving wedge.

Said reduction mechanism has an advantage in that the position of the adjustable stop device comprising the drum 13 is located on the side of the corresponding machine. This accordingly facilitates access to the stop device for a change of program by replacing one rotary drum 13 by another.

It should be stated, however, that the mechanism for motion reduction between the stop device supporting carriage 5 and the thrust member 12 which is applied against the studs 14 of the control drum 13 can be of different design. It would thus be possible to employ a mechanism comprising a steel band or chain which is passed over pulleys or pinions having different diameters or a system comprising levers or other motion-reduction devices.

It should also be noted that the use of the device under consideration is not limited to a bending press for determining the various successive positions of bending of a metal sheet.

In point of fact, said device can also be employed in any other machine-tool such as a shearing machine in order to set a part to be machined in a series of successive positions.

What we claim is:

1. A device for positioning articles, comprising a support; first means mounted on said support for displacement in a first direction and operative for engaging an article so as to position the same relative to said suport; second means mounted on said support for displacement in a second direction substantially normal to said first direction and in a predetermined path; third means interposed between said first and second means and operative for transforming said displacement of said first means into said displacement of said second means in a predetermined ratio and including a wedge member having a sloping cam surface and connected to said second means to share said displacement thereof in said second direction, and a cam follower arrangement mounted on said first means to share said displacement thereof in said first direction and engaging said sloping cam surface of said wedge member; means for driving one of said first, second and third means so as to displace said first and second means in said ratio; and stop means mounted on said support for movement in a third direction substantially normal to said second direction and having a plurality of abutment portions sequentially projecting to various extents into said path of displacement of said second means during said movement of said stop means in said third direction to thereby limit said displacement of said second means, whereby said displacement of said first means is also limited via said third means.

2. A device as defined in claim 1, wherein said cam follower includes a roller which engages said sloping cam surface.

3. A device as defined in claim 1, wherein said first means includes a carriage, and at least one retaining member connected to said carriage to share said displacement thereof and engage the article.

4. A device as defined in claim 1, wherein said second means includes a thrust member; and wherein said stop means includes a drum having said abutment portions and mounted on said support for indexing between a plurality of positions in each of which one of said abutment portions extends into the path of displacement of said thrust member in said second direction to limit said displacement of said thrust member.

5. A device as defined in claim 4, wherein said drum is mounted on said support for rotation about an axis parallel to and offset from said path of displacement of said thrust member.

6. A device as defined in claim 4, wherein said drum is removably mounted on said support; and further comprising at least one additional similar drum having abutment portions which extend into said path of displacement of said thrust member to different extents than those of the first-mentioned drum so as to substitute a different sequence of positioning operations for the previous sequence presented by said first-mentioned drum.

* * * * *